(12) United States Patent
Verma et al.

(10) Patent No.: US 10,587,671 B2
(45) Date of Patent: Mar. 10, 2020

(54) SYSTEMS AND METHODS FOR TRACKING AND AUDITING CHANGES IN A MULTI-TENANT CLOUD SYSTEM

(71) Applicants: Manav Verma, Fremont, CA (US); Sofian Halim, Fremont, CA (US); Gunjan Bhasin, Dublin, CA (US)

(72) Inventors: Manav Verma, Fremont, CA (US); Sofian Halim, Fremont, CA (US); Gunjan Bhasin, Dublin, CA (US)

(73) Assignee: Zscaler, Inc., San Jose, CA (US)

( * ) Notice: Subject to any disclaimer, the term of this patent is extended or adjusted under 35 U.S.C. 154(b) by 385 days.

(21) Appl. No.: 14/794,908

(22) Filed: Jul. 9, 2015

(65) Prior Publication Data
US 2017/0011079 A1    Jan. 12, 2017

(51) Int. Cl.
| H04L 29/08 | (2006.01) |
| G06F 21/62 | (2013.01) |
| H04L 12/24 | (2006.01) |
| G06F 21/00 | (2013.01) |
| G06F 16/958 | (2019.01) |
| G06F 16/951 | (2019.01) |

(52) U.S. Cl.
CPC ............ *H04L 67/02* (2013.01); *G06F 16/951* (2019.01); *G06F 16/972* (2019.01); *G06F 21/00* (2013.01); *G06F 21/6227* (2013.01); *H04L 41/5009* (2013.01); *H04L 41/5096* (2013.01); *H04L 67/22* (2013.01); *H04L 67/2819* (2013.01)

(58) Field of Classification Search
CPC ............ G06F 17/30368; G06F 16/951; G06F 16/972; H04L 67/22
See application file for complete search history.

(56) References Cited

U.S. PATENT DOCUMENTS

| 8,750,123 B1* | 6/2014 | Alisawi ............. H04W 28/0284 370/231 |
| 8,955,091 B2 | 2/2015 | Kailash et al. |
| 8,972,405 B1* | 3/2015 | Chaulk ............. G06F 17/30194 707/737 |
| 9,003,023 B2 | 4/2015 | Crank et al. |
| 2011/0213752 A1* | 9/2011 | Surtani ............... H04L 67/1095 707/613 |
| 2012/0072985 A1* | 3/2012 | Davne ................. H04L 63/0272 726/22 |
| 2012/0117644 A1* | 5/2012 | Soeder .................. G06F 21/554 726/22 |
| 2013/0297888 A1* | 11/2013 | Yamashita ............ G06F 9/5016 711/141 |

(Continued)

*Primary Examiner* — Marc S Somers
(74) *Attorney, Agent, or Firm* — Clements Bernard Walker; Lawrence A. Baratta, Jr.

(57) ABSTRACT

Systems and methods for tracking and auditing changes in one or more cloud-based systems include, at a Web application, intercepting requests between one or more users and the Web application associated with the one or more cloud-based systems and creating log messages based on the intercepted requests; at a log forwarder in the logging system, forwarding the log messages to a log indexer; at the log indexer in the logging system, receiving the forwarded log messages and indexing the forwarded log messages in a centralized storage; and, at the logging system, responsive to a query, forwarding responsive indexed data from the centralized storage, based on the query.

20 Claims, 12 Drawing Sheets

(56) References Cited

U.S. PATENT DOCUMENTS

| | | | |
|---|---|---|---|
| 2013/0339514 A1* | 12/2013 | Crank | H04L 63/1408 |
| | | | 709/224 |
| 2014/0195720 A1* | 7/2014 | Akella | G06F 12/0246 |
| | | | 711/103 |
| 2014/0196115 A1* | 7/2014 | Pelykh | H04L 63/08 |
| | | | 726/4 |
| 2014/0278754 A1* | 9/2014 | Cronin | G06F 17/30539 |
| | | | 705/7.29 |
| 2015/0101021 A1* | 4/2015 | Mc Erlean | G06F 17/30575 |
| | | | 726/4 |
| 2015/0227598 A1* | 8/2015 | Hahn | G06F 16/122 |
| | | | 707/722 |
| 2016/0004733 A1* | 1/2016 | Cao | G06F 11/0709 |
| | | | 707/755 |

\* cited by examiner

| | A | B | C | D | E |
|---|---|---|---|---|---|
| 1 | Administrator | admin@manav.com | | | |
| 2 | Report Created | 03 Mar 2015 12:34:56, PST | | | |
| 3 | Start Time | 27 Mar 2015 03:00:00, PDT | | | |
| 4 | End Time | 13 Mar 2015 03:59:59, PDT | | | |
| 5 | Date and Time | User | Action | Resource | Pre Action | Post Action |
| 6 | 27 Mar 2015 11:50:46, admin@manav.com | Create | Role Management | | Name=HH<br>Dashboard Access=View Only<br>Reporting Access=View Only<br>Insights Access=View Only<br>Policy Access=View Only<br>Administrators Access=None<br>User Name=Visible<br>Functional Scope=[Access Control,Advanced Settings,Authentication Configuration,Data Loss Prevention,Firewall & QPS,MSS Configuration,Security,SSL Policy,Traffic Forwarding] |
| 7 | 27 Mar 2015 04:08:25, admin@manav.com | Delete | Virtual ZENS Virtual Zen | Name=SR1.1<br>Enabled=<br>Proxy IP Address=192.168.34.10<br>Subnet Mask=255.255.255.0<br>Default Gateway=192.168.34.10<br>Deployment Mode=Cluster<br>Load Balancer IP Address=192.168.34.20 | |
| 8 | 27 Mar 2015 04:08:06, admin@manav.com | Delete | Virtual ZENS Virtual ZEN Cluster | Name=VSR1<br>Enabled=<br>Cluster IP Address=192.168.34.100<br>Subnet Mask=255.255.255.0<br>Virtual ZENS={} | |
| 9 | 27 Mar 2015 03:42:26, admin@manav.com | Update | Virtual ZENS Virtual Zen | Name=SR1.0<br>Enabled=<br>Proxy IP Address=192.168.34.10<br>Subnet Mask=255.255.255.0<br>Default Gateway=192.168.34.10<br>Deployment Mode=Cluster<br>Load Balancer IP Address=192.168.34.20 | Name=SR1.1<br>Enabled=<br>Proxy IP Address=192.168.34.10<br>Subnet Mask=255.255.255.0<br>Default Gateway=192.168.34.10<br>Deployment Mode=Cluster<br>Load Balancer IP Address=192.168.34.20 |
| 10 | 27 Mar 2015 03:40:36, admin@manav.com | Create | Virtual ZENS Virtual ZEN Cluster | | Name=SR1.0<br>Enabled=<br>Proxy IP Address=192.168.34.10<br>Subnet Mask=255.255.255.0<br>Default Gateway=192.168.34.1<br>Deployment Mode=Cluster<br>Load Balancer IP Address=192.168.34.20 |
| 11 | 27 Mar 2015 03:38:26, admin@manav.com | Update | Virtual ZENS Virtual Zen | Name=SR1.0<br>Enabled=<br>Proxy IP Address=192.168.34.10<br>Subnet Mask=255.255.255.0<br>Default Gateway=192.168.34.1<br>Deployment Mode=Cluster<br>Load Balancer IP Address=192.168.34.20 | Name=SR1.0<br>Enabled=<br>Proxy IP Address=192.168.34.10<br>Subnet Mask=255.255.255.0<br>Default Gateway=192.168.34.1<br>Deployment Mode=Cluster<br>Load Balancer IP Address=192.168.34.20 |
| 12 | 27 Mar 2015 03:37:56, admin@manav.com | Create | Virtual ZENS Virtual Zen | | Name=SR1.0<br>Enabled=<br>Proxy IP Address=192.168.34.10<br>Subnet Mask=255.255.255.0<br>Default Gateway=192.168.34.1<br>Deployment Mode=Cluster<br>Load Balancer IP Address=192.168.34.20 |

FIG. 13

SYSTEMS AND METHODS FOR TRACKING AND AUDITING CHANGES IN A MULTI-TENANT CLOUD SYSTEM

FIELD OF THE DISCLOSURE

The present disclosure generally relates to computer networking systems and methods. More particularly, the present disclosure relates to systems and methods for tracking and auditing changes in a multi-tenant cloud system.

BACKGROUND OF THE DISCLOSURE

Cloud services, delivered through cloud-based systems, are experiencing rapid growth. In fact, users and Information Technology (IT) administrators are using cloud services for more and more applications. In such a globally distributed architecture where multiple applications, distributed across various data centers around the globe, are making changes to enterprise data, it becomes more and more important to audit all the configuration changes done by administrators. The main objectives of auditing are to figure out what was changed, when it was changed, and who changed it, and this information can used to: (1) track all administrator actions and monitor their role based access, (2) provide ability to track conflicting changes done by more than one administrator, (3) keep an eye on the security of enterprise applications/services by tracking unsuccessful logging attempts, and identify possible security attacks, and (4) secure enterprise data in a multi-tenant cloud service environments. Conventionally, it is the responsibility of application developers to add programming logic that can keep track of all the administrator actions. This not only contributes to development time and efforts but also add overhead to business applications. An application needs to perform these audit related activities along with its main business objectives that require more storage space and processor cycles including requiring storage space to store administrator's actions, and retrieving related audit logs from a vast number of records takes a lot of processor cycles. That is, traditionally, software developers use homegrown solutions to store entire audit logs and massage the data to fetch the results. This is a very time-consuming process and prone to performance issues.

This raises a need for an approach that takes storage and reporting, of these logs, separate from the main business application.

BRIEF SUMMARY OF THE DISCLOSURE

In an exemplary embodiment, a method for tracking and auditing changes in one or more cloud-based systems includes, at a Web application, intercepting requests between one or more users and the Web application associated with the one or more cloud-based systems and creating log messages based on the intercepted requests; at a log forwarder in the logging system, forwarding the log messages to a log indexer; at the log indexer in the logging system, receiving the forwarded log messages and indexing the forwarded log messages in a centralized storage; and, at the logging system, responsive to a query, forwarding responsive indexed data from the centralized storage, based on the query. The method can further include, at the Web application, receiving the forwarded responsive indexed data, creating and formatting the forwarded responsive indexed data for an audit report; and providing the audit report to a user. The Web application can include main application logic and interception logic, wherein the intercepting requests and the creating log messages is performed by the interception logic, and the forwarding is performed by the log forwarder, separately from the main application logic of the Web application. The interception logic can be implemented in a non-blocking Input/output (IO) thread separate from processor cycles which are reserved for the main application logic. The requests can include configuration changes for the one or more cloud-based systems by the one or more users. The one or more cloud-based systems can be a distributed, cloud-based security system. The one or more cloud-based systems can include at least two cloud-based systems which are separate and distinct from one another, the logging system is configured to store the forwarded log messages in the centralized storage from the at least two cloud-based systems in a segregated manner. Auditing and tracking information associated with the Web application can be stored in the centralized storage which is separate from the Web application. The logging system can include a big data server. The intercepted requests can include HyperText Transfer Protocol (HTTP) requests.

In another exemplary embodiment, a logging system for tracking and auditing changes in one or more cloud-based systems includes one or more Web applications associated with the one or more cloud-based systems; and a logging system communicatively coupled to the one or more Web applications, wherein the logging system includes a log forwarder and a log indexer; wherein the one or more Web applications are configured to intercept requests between one or more users and the one or more Web applications associated with the one or more cloud-based systems and create log messages based on the intercepted requests; wherein the log forwarder is configured to forward the log messages to the log indexer; wherein the log indexer is configured to receive the forwarded log messages and index the forwarded log messages in a centralized storage; and wherein the logging system, responsive to a query, is configured to forward responsive indexed data from the centralized storage, based on the query. The one or more Web applications can be further configured to receive the forwarded responsive indexed data, create and format the forwarded responsive indexed data for an audit report, and provide the audit report to a user. The one or more Web applications each an include main application logic and interception logic, wherein the intercepting requests and the creating log messages is performed by the interception logic, and the forwarding is performed by the log forwarder, separately from the main application logic of the Web application. The interception logic can be implemented in a non-blocking Input/output (IO) thread separate from processor cycles which are reserved for the main application logic. The requests can include configuration changes for the one or more cloud-based systems by the one or more users. The one or more cloud-based systems can be a distributed, cloud-based security system. The one or more cloud-based systems can include at least two cloud-based systems which are separate and distinct from one another, the logging system configured to store the forwarded log messages in the centralized storage from the at least two cloud-based systems in a segregated manner. Auditing and tracking information associated with the Web application can be stored in the centralized storage which is separate from the Web application. The logging system can include a big data server.

In a further exemplary embodiment, a Web application server includes a network interface; a processor; and memory storing instructions that, when executed, cause the processor to authenticate a user associated with a cloud-based system, receive instructions from the user for making changes in the cloud-based system, intercept the instructions in a form of an HyperText Transfer Protocol (HTTP) request, and create a log message based on the intercepted HTTP request, wherein a logging system is configured to retrieve and index the log message from the Web application server for indexing in centralized storage, wherein the Web application server includes main application logic and interception logic, wherein the intercepting requests and the creating log messages is performed by the interception logic, and the forwarding is performed by the log forwarder, separately from the main application logic of the Web application, and wherein the interception logic is implemented in a non-blocking Input/output (IO) thread separate from processor cycles which are reserved for the main application logic.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a distributed security system, and the like;

FIG. 13 is a CSV file of an exemplary audit report from the logging system of FIG. 7 or the distributed auditing and tracking system of FIG. 9.

DETAILED DESCRIPTION OF THE DISCLOSURE

Figure 1:
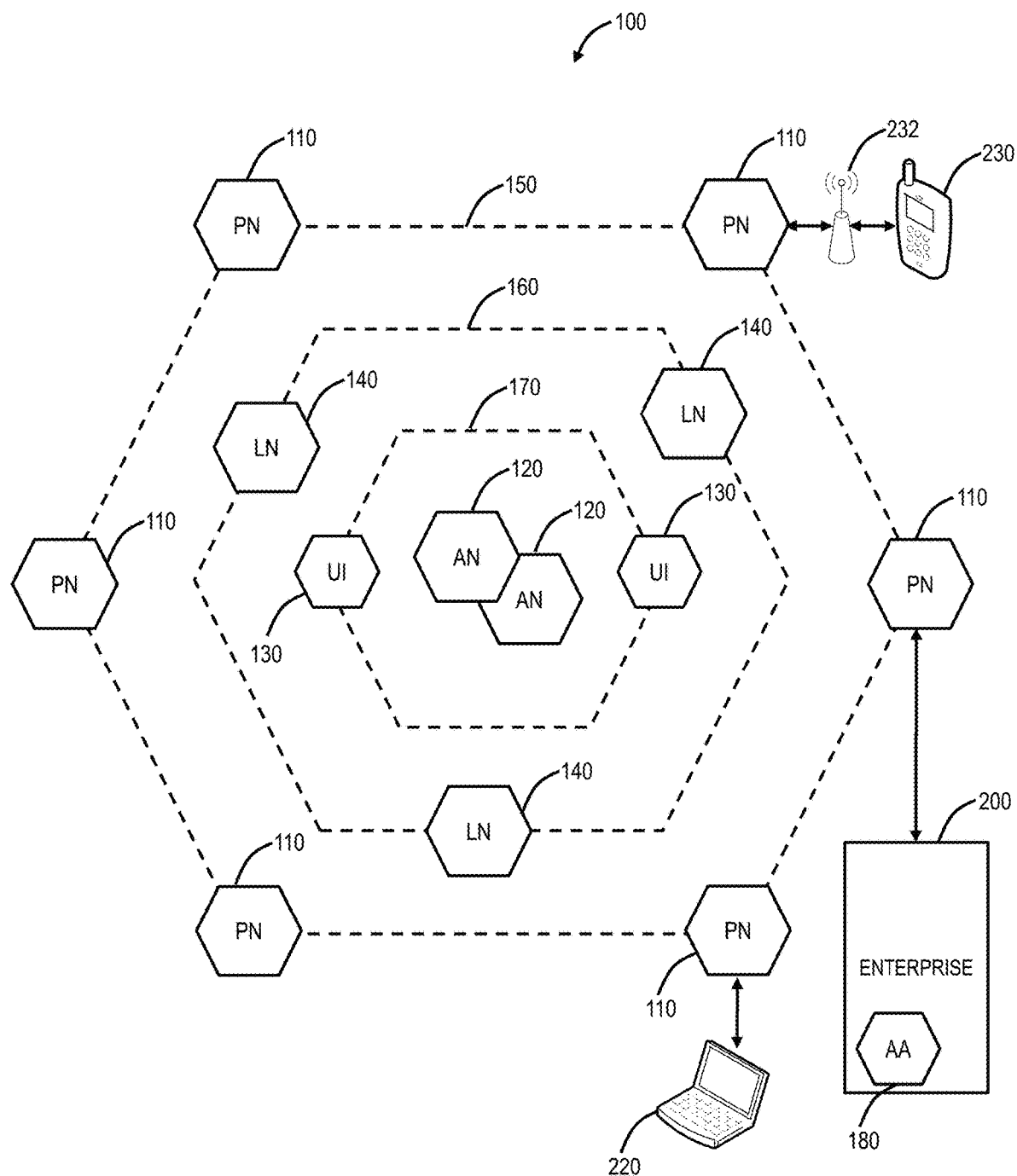

In various exemplary embodiments, systems and methods are described for tracking and auditing changes in a multi-tenant cloud system. The systems and methods use logging, log forwarding, and log indexing to achieve a tracking and auditing system in a multi-tenant cloud system that is separate and distinct from associated application logic, i.e., all auditing and tracking activities are segregated from the main application logic. The logs can be centrally located and indexed by creation time, organization, and user details. Advantageously, the systems and methods provide benefits including security, centralized data, data integrity, and business process improvement. For security, audit logs can help accomplish several security-related objectives, including individual accountability, reconstruction of events, intrusion detection, and problem analysis. For centralized data, there are multiple solutions available conventionally that log a lot of information, but nobody consumes that data. In the case of multi-tenant cloud environment, it becomes more and more important to centralize the data and analyze it. Centralizing the log data helps in securing and replicating it on another secondary server, providing fault tolerance. For data integrity, for the log data to be useful, it must be secured from unauthorized access and integrity problems. In this approach, complete segregation is introduced among the duties between those who administer system/network accounts and those who can access the log data. For business process improvement, once implemented in the cloud, the systems and methods enable analyzing the log and audit data to improve processes and business focus. Using these reports, one can easily pinpoint what customer's day-to-day activities are and how to make these activities more efficient.

There are various benefits of this approach. First, file system storage is used to store all the audit logs. This approach is much better than storing all these audit logs in a database, allowing the database space for application data. Second, a traditional auditing mechanism uses database level records to determine changes. In a cloud environment, a business object is abstracted at a web services level. Hence intercepting a request (e.g., a HyperText Transfer Protocol (HTTP)) to figure out the administrator intentions is more efficient as compared to listening to database change events. Third, HTTP tracking helps monitoring changes done by cloud administrators as well as enterprise administrators. Fourth, the storage mechanism used in this approach is de-normalizing all the auditing related data into a log message. The traditional approach of storing the information into database tables requires a lot of different tables and costly joins for storage. Fifth, because log messages are schema-less, there are no database patches or upgrade required whenever there is a change in business objects. Moreover—this approach can be extended to any object that can be represented in a string format. Sixth, in a multi-tenant environment, consolidation of all the data at a central location and indexed on organization identifier results in faster query results. Seventh, storage and indexing logic audit logs is taken out of the main application. Finally, with this approach, the overall application development time is greatly reduced.

§ 1.0 Example High-Level System Architecture—Cloud-Based Security System

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes processing nodes (PN) 110, that proactively detect and preclude the distribution of security threats, e.g., malware, spyware, viruses, email spam, etc., and other undesirable content sent from or requested by an external system. The processing nodes 110 can also log activity and enforce policies, including logging changes to the various components and settings in the system 100. Example external systems may include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
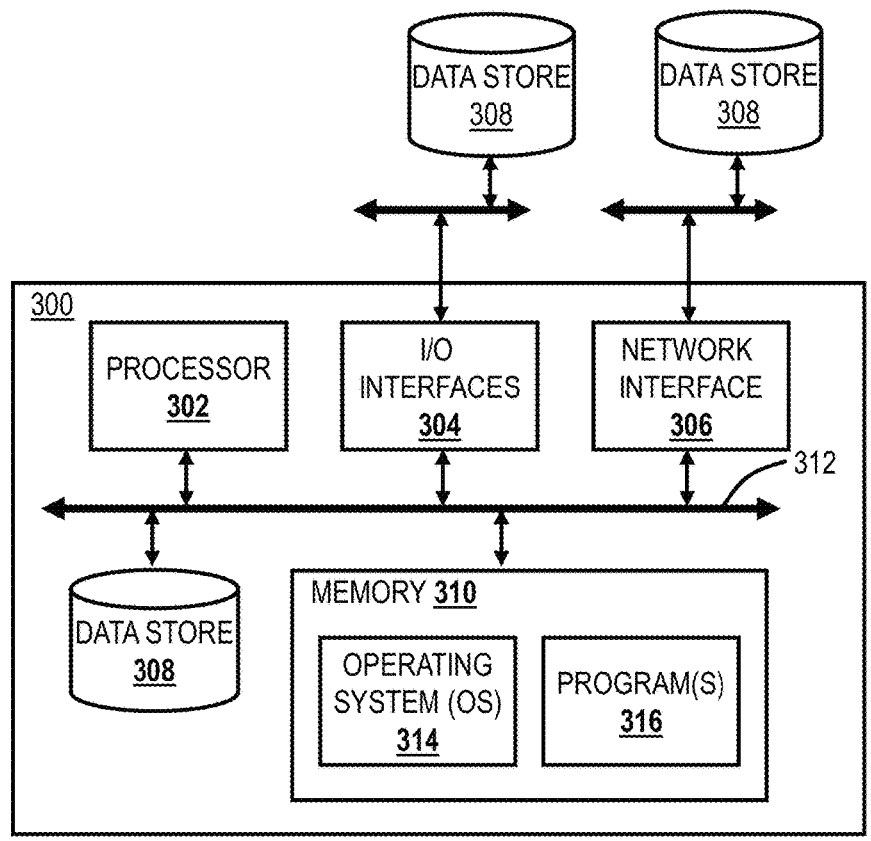
FIG. 3 is a block diagram of a server which may be used in the distributed security system of FIG. 1 or with any other cloud-based system.

Each of the processing nodes 110 may be implemented by one or more of computer and communications devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the access nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 170. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the tracking and auditing systems and methods contemplate operation on any cloud-based system.

§ 2.0 Example Detailed System Architecture and Operation

Figure 2:
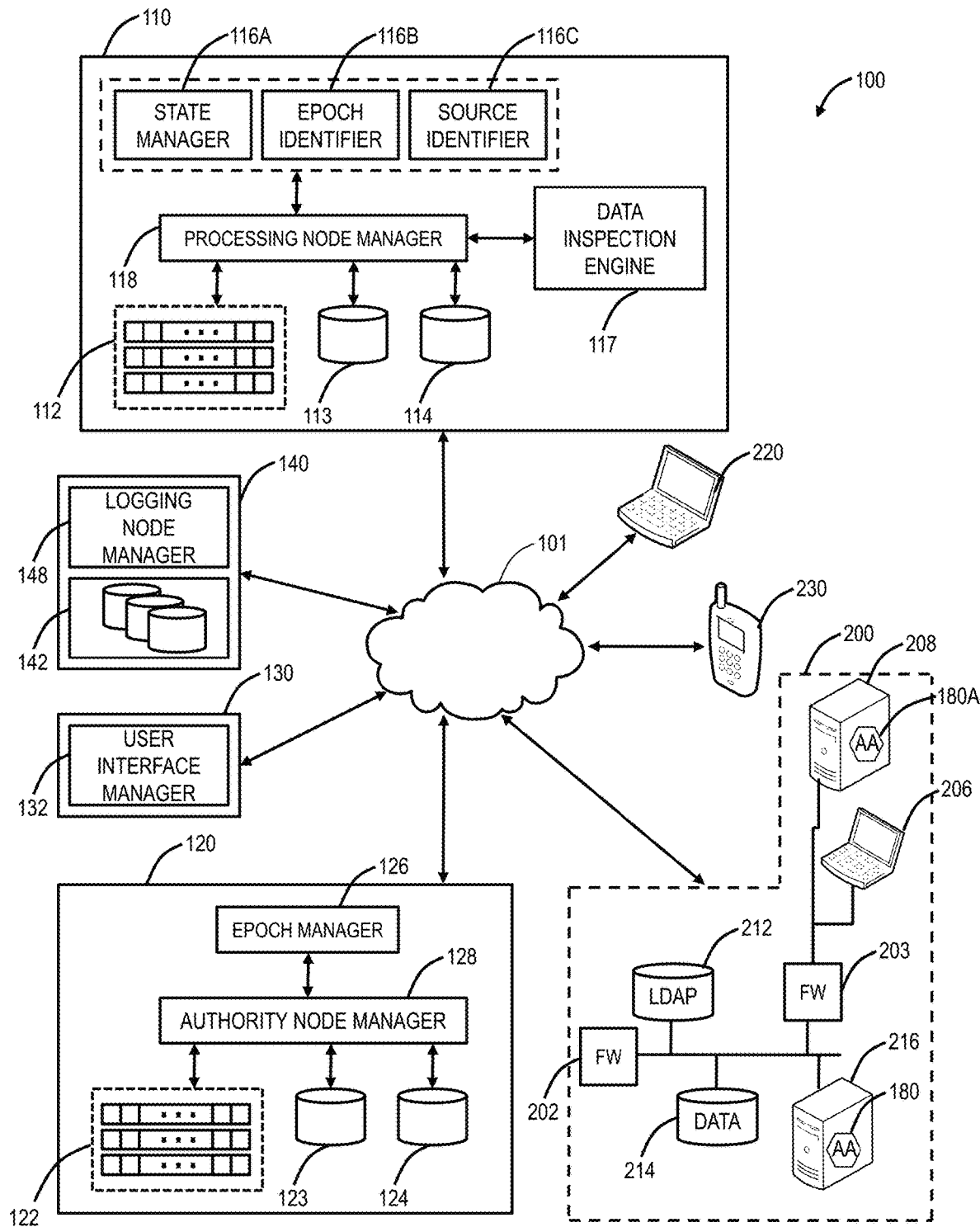
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

§ 2.1 Example Processing Node Architecture

In an exemplary embodiment, the processing nodes 110 are external to network edges of the external systems 200, 220 and 230. Each of the processing nodes 110 stores security policies 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§ 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§ 3.0 Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Exemplary Mobile Device Architecture

Figure 4:
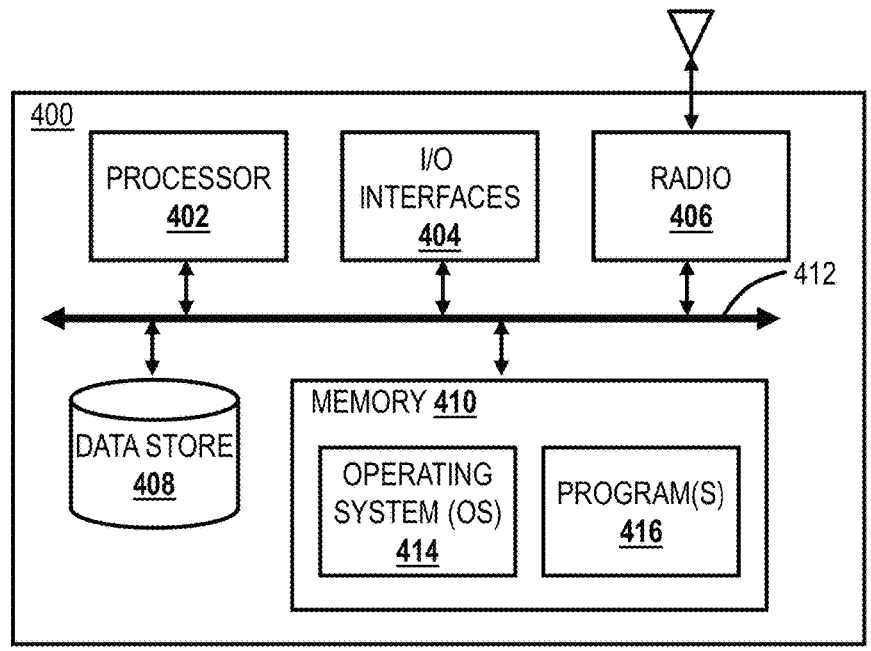
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 410 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 402 is configured to execute software stored within the memory 410, to communicate data to and from the memory 410, and to generally control operations of the mobile device 410 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 410. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§ 5.0 Exemplary General Cloud System

Figure 5:
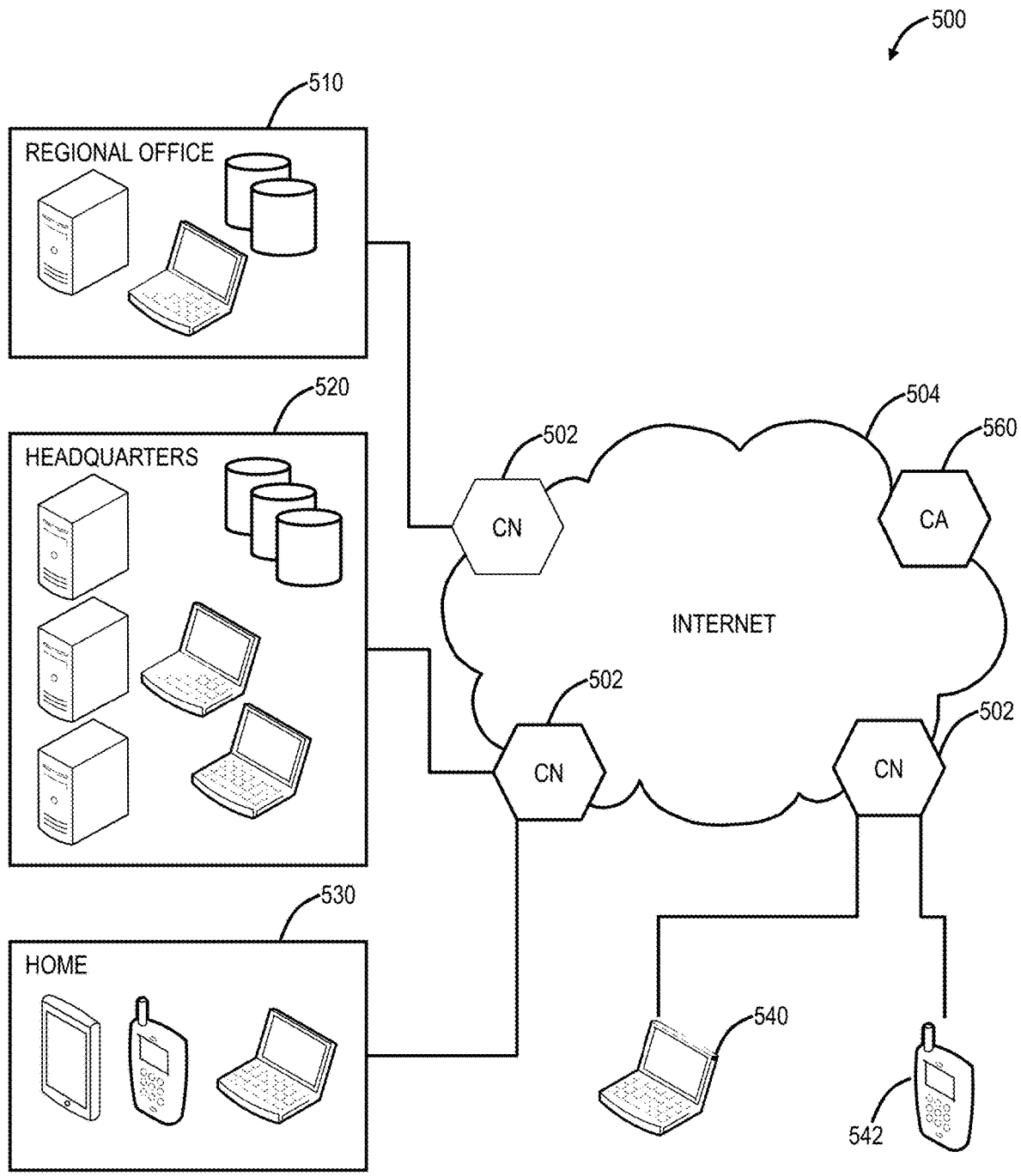
FIG. 5 is a network diagram of a generalized cloud-based system.

Referring to FIG. 5, in an exemplary embodiment, a cloud system 500 is illustrated for implementing the systems and methods described herein for tracking and auditing changes in a multi-tenant cloud system. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud0based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is, each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 500 and the distributed security system 100 may be viewed as Security-as-a-Service through the cloud. In general, the cloud system 500 can be configured to perform any function in a multi-tenant environment. For example, the cloud system 500 can provide content, collaboration between users, storage, application hosting, and the like.

In an exemplary embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources and minimizing development complexity and runtime processing. The cloud system 500 (and the system 100) can be offloaded from complex tracking and auditing functions so that it can provide its primary function. In the context of a distributed security system, the tracking and auditing systems and methods enable accountability, intrusion detection, problem diagnosis, and data reconstruction, all in an optimized fashion considering the exponential growth in cloud-based systems.

§ 6.0 DNS Augmented Security

In an exemplary embodiment, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 500 are in the data path of connecting users. Another approach can include a passive approach to the data path. DNS is one of the most fundamental IP protocols. With DNS surrogation as a technique, it is proposed to use DNS for dynamic routing of traffic, per user authentication and policy enforcement, and the like.

In conjunction with the cloud system 500 and/or the distributed security system 100, various techniques can be used for monitoring which are described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 6:
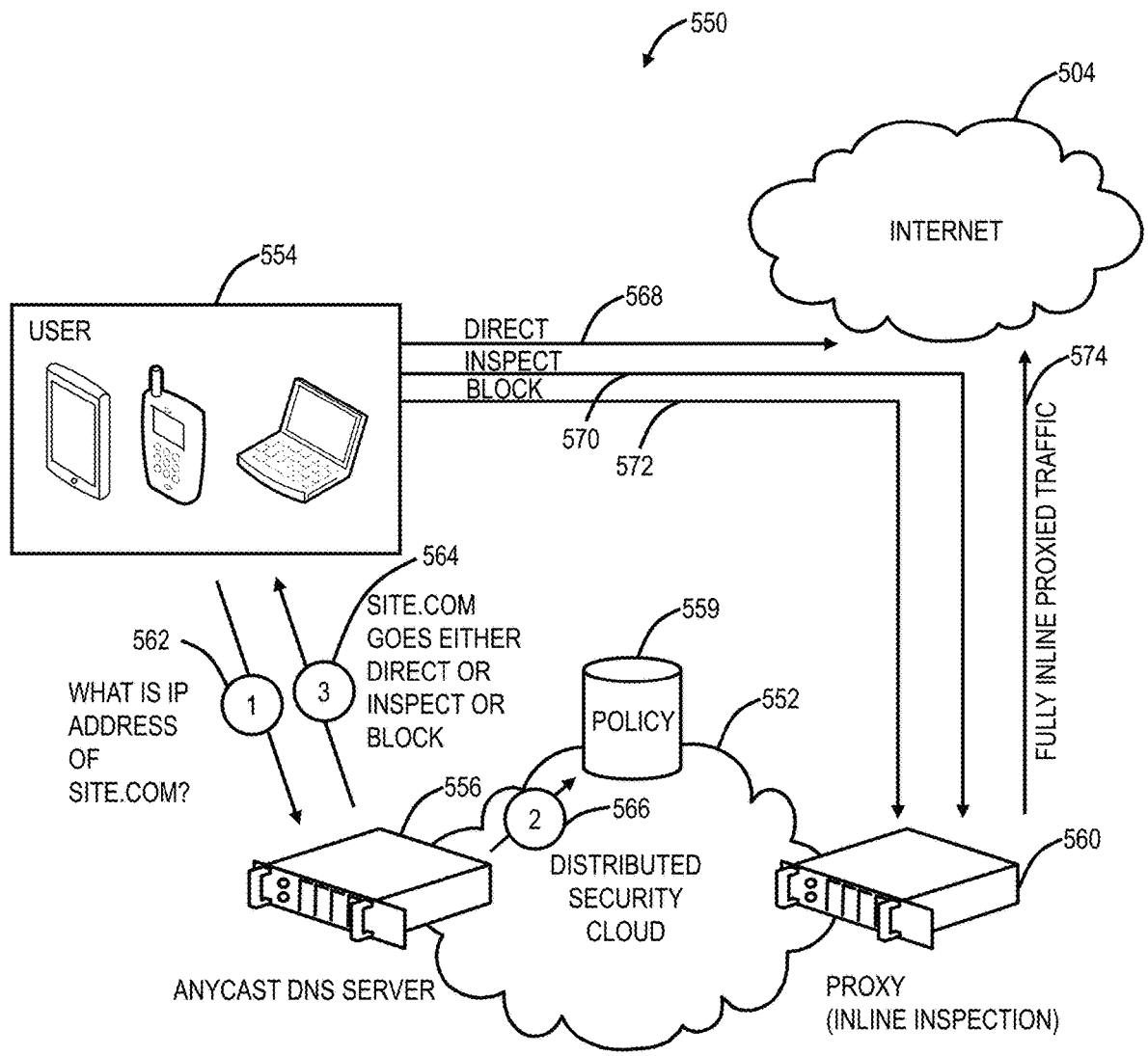
FIG. 6 is a network diagram of a network with a distributed security cloud providing DNS augmented security.

Referring to FIG. 6, in an exemplary embodiment, a network diagram illustrates a network 550 with a distributed security cloud 552 providing DNS augmented security. The network 550 includes a user device 554 connecting to the distributed security cloud 552 via an anycast DNS server 556. The anycast DNS server 556 can be a server such as the server 300 of FIG. 3. Also, the anycast DNS server 556 can be the processing node 110, the cloud node 502, etc. The distributed security cloud 552 includes the anycast DNS server 556, policy data 558, and an inline proxy 560. The inline proxy 560 can include the processing node 110, the cloud node 502, etc. In operation, the user device 554 is configured with a DNS entry of the anycast DNS server 556, and the anycast DNS server 556 can perform DNS surrogation as is described herein. The distributed security cloud 552 utilizes the anycast DNS server 556, the policy data 558, and the inline proxy 560 to perform the DNS augmented security.

The network 550 illustrates the DNS augmented security where DNS information is used as follows. First, at a step 562, the user device 554 requests a DNS lookup of a site, e.g. "what is the IP address of site.com?" from the anycast DNS server 556. The anycast DNS server 556 accesses the policy data 558 to determine the policy associated with the site at step 564. The anycast DNS server 556 returns the IP address of the site based on the appropriate policy at step 566. The policy data 558 determines if the site either goes direct (step 568) to the Internet, is inspected by the inline proxy (step 570), or is blocked per policy (step 572). Here, the anycast DNS server 556 returns the IP address with additional information if the site is inspected or blocked. For example, if the anycast DNS server 556 determines the access is direct, the anycast DNS server 556 simply returns the IP address of the site. If the anycast DNS server 556 determines the site is blocked or inspected, the anycast DNS server 556 returns the IP address to the inline proxy 560 with additional information. The inline proxy 560 can block the site or provide fully inline proxied traffic to the site (step 574) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 550 can be used with the distributed security system 100 and the cloud system 500 to provide cloud-based security without requiring full inline connectivity.

§ 7.0 Log Indexer System

Figure 7:
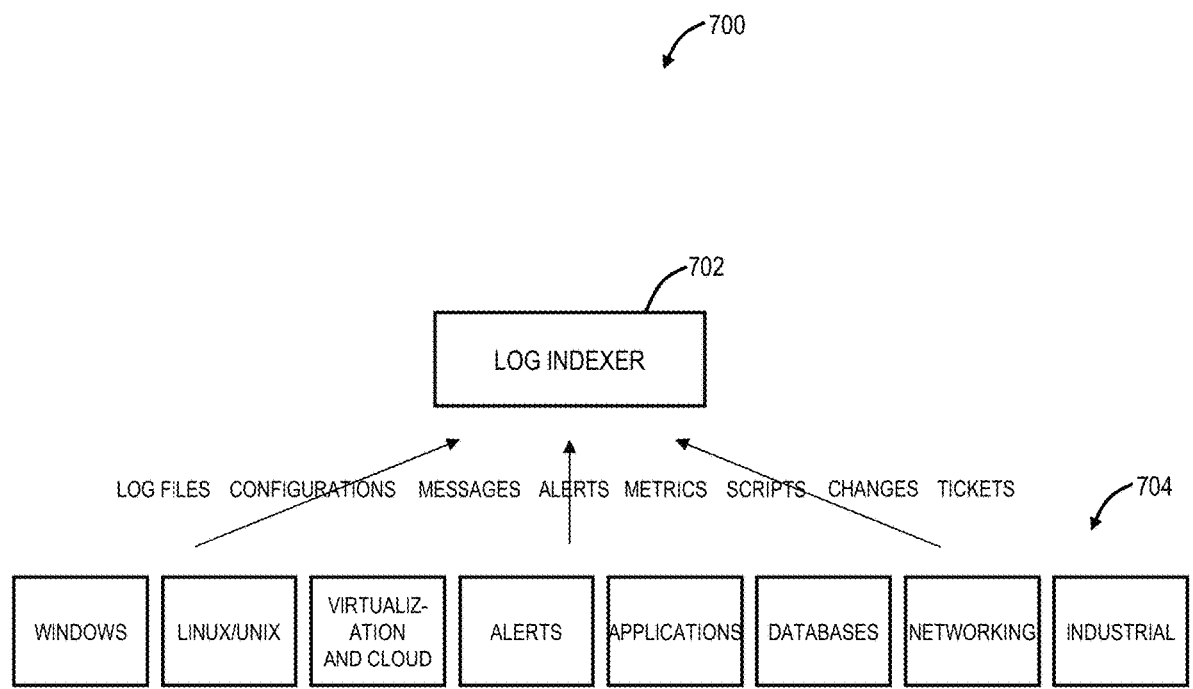
FIG. 7 is a functional block diagram of a logging system for tracking and auditing changes in a multi-tenant cloud system, such as the system of FIG. 1, the cloud-based system of FIG. 5, etc.

Referring to FIG. 7, in an exemplary embodiment, a functional block diagram illustrates a logging system 700 for tracking and auditing changes in a multi-tenant cloud system, such as the system 100, the cloud-based system 500, etc. The logging system 700 includes a log indexer 702 and a log forwarder 704, each is represented functionally in FIG. 7, but generally includes one or more servers 300 to implement the functionality. The logging system 700 operates concurrently with the system 100, the cloud-based system 500, etc. but is separate, distinct, segregated, etc. Generally, the log forwarder 704 is configured to forward messages to the log indexer 702, as warranted. The log forwarder 704 can operate on any platform or operating system (Windows, Linux, mobile platforms, virtualization and the cloud, etc.) and/or with any alerts, applications, databases, networking protocols, and industries. The log forwarder 704 is configured to send one or more of log files, configurations, messages, alerts, metrics, scripts, changes, tickets, and the like to the log indexer 702. The log files, configurations, messages, alerts, metrics, scripts, changes, tickets, and the like can be collectively referred to as tracking and auditing data. The log indexer 702 is configured to store, index, analyze, and retrieve the tracking and auditing data. As is described herein, the log indexer 702 can utilize various big data techniques. Again, the log indexer 702 and the log forwarder 704 are separate from the system 100, the cloud-based system 500, etc.

There are various challenges in managing the tracking and auditing data in a cloud-based system. First, the tracking and auditing data is multi-tenant, i.e., data belongs to different organizations and within a specific organization, it can have department or user level restriction or the like. Thus, the logging system 700 needs to incorporate user, groups of users, and organization-level segregation from general access. Second, data is coming from multiple Web applications or the like, distributed across data centers all over the world. The logging system 700 needs a centralized approach for the collection, management, and analysis, from a vastly distributed system. Third, the data format is not fixed. The logging system 700 must be an extensible, scalable and schema-less approach. Accordingly, in the logging system 700, any logs, in any format, can be forwarded to the logging indexer 702. In the logging system 700, the data is schema-less because administrators manage thousands of business objects; the tracking and auditing data it could be any log message such as Syslog, network alarms, etc.

§ 7.1 Log Indexer System Flow

Figure 8:
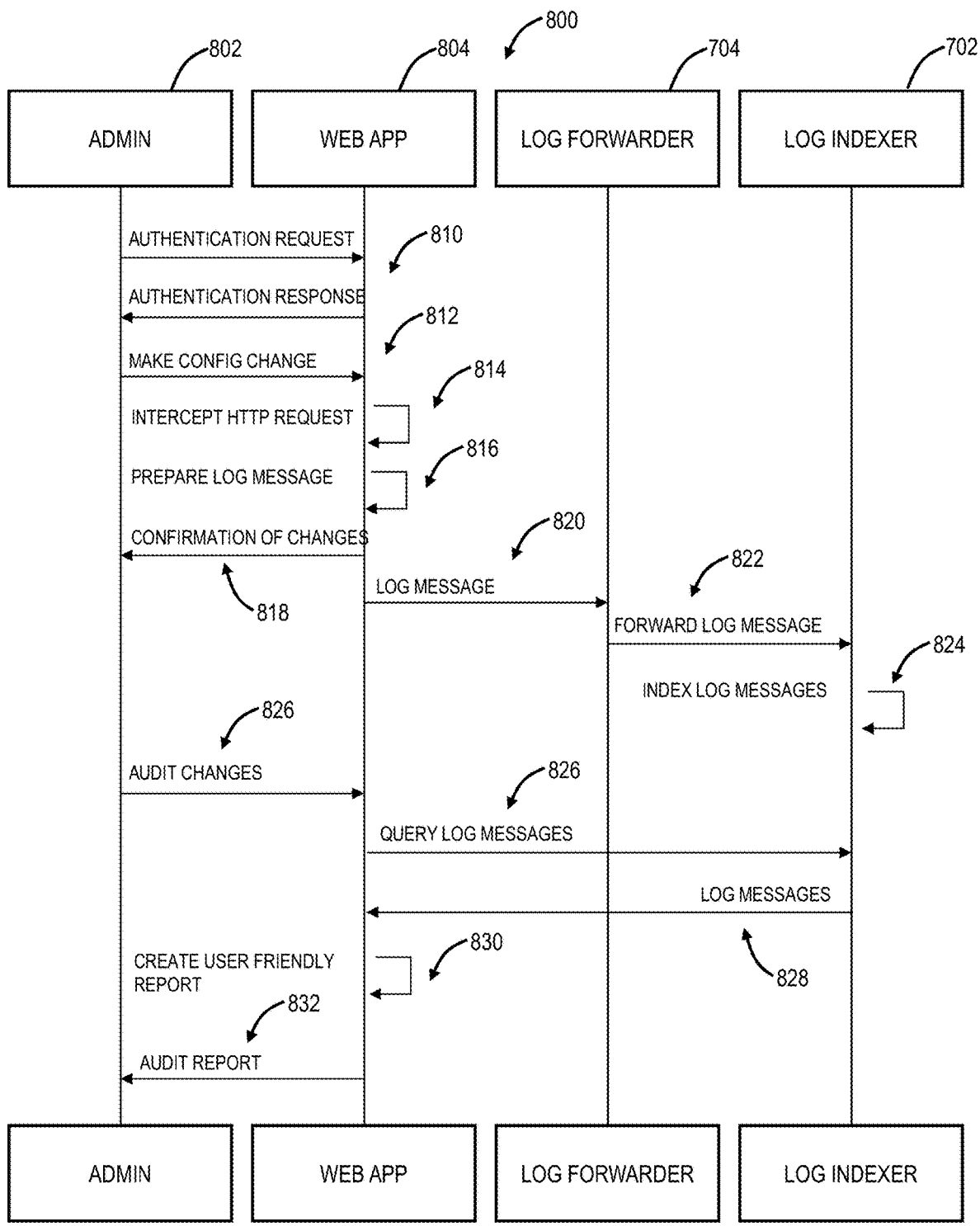
FIG. 8 is a flow diagram of an exemplary operation of the logging system of FIG. 7.

Referring to FIG. 8, in an exemplary embodiment, a flow diagram illustrates an exemplary operation 800 of the logging system 700. Specifically, the operation 800 includes associated actions with the log indexer 702, the log forwarder 704, an admin 802, and a Web application 804. For example, the admin 802 can include an administrator performing operations on an associated mobile device, laptop, desktop, or the like. The Web application 804 can be associated with a cloud-based system, such as the system 100, the cloud-based system 500, etc. For example, the Web application 804 can be hosted or operated in the processing nodes 110, the authority nodes 120, the UI 130, the logging nodes 140, and/or the cloud nodes 502. It is the objective of the logging system 700 to track and audit activity performed by the admin 802 on the Web application 804 (note, in a practical embodiment, the operation 800 can include various admins 802, each performing activities in various Web applications 804).

In an exemplary embodiment, various functions can be implemented in Java, although any implementation is contemplated. Also, the Web application 804 can use a Representational State Transfer (REST) Application Programming Interface (API); other implementations are also contemplated such as Simple Object Access protocol (SOAP), Web Services Description Language (WSDL), or the like. The log indexer 702 can use any format to store information, such as JavaScript Object Notation (JSON). For example, serialization of Java objects to JSON string and deserialization JSON string to Java objects was used to share the data among storage and application.

The exemplary operation 800 is now described. The admin 802 logs into a cloud-service web portal (step 810). Here, the admin 802 makes an authentication request to the Web application 804, and the Web application 804 processes the authentication request, and, sends an authentication response. Note, for purposes of the operation 800, it is assumed the authentication request is successful, but the authentication response could be a failure. Once authenticated, the admin 802 can perform various functions in the Web application 804, based on their user level, privileges, etc. It is the intent of the logging system 700 to keep track of all activity on the admin 802 (and all other admins 802), separately from the Web application 804. The operation 800 includes the admin 802 performing some action, such as making a configuration change (step 812). That is, the admin 802 interacts with main application logic of the Web application 804 to perform functions, e.g., configuration changes, modify policy, modify users, review auditing and logging data, and the like.

The Web application 804 includes interception logic which is separate and distinct from the main application logic. With the interception logic, the Web application 804 is configured to intercept an HTTP request associated with any of the interactions by the admin 802 with the Web application 804 (step 814). The Web application 804, through the interception logic, is configured to dump all the required information from the intercepted HTTP request into a log file for properly auditing and tracking the associated activity by the admin 802. The abstracted information can include, e.g., a type of request (create/update/delete), organization details (associated with the interaction), administrator details (information associated with the admin 802 performing the interaction), date/time information, and information detailing any changes associated with the interaction.

Subsequent to the HTTP request interception and abstraction of the associated information, the Web application, through the interception logic, prepares a log message for the log indexer 702 (step 816). The interception logic serializes all the information and stores it in a log file using standard logging mechanisms. Again, the interception logic runs in a separate non-blocking Input/output (IO) thread keeping processor cycles reserved for the main application logic. Specifically, when the admin 802 makes a request, that request is intercepted at the Web application 804 level. The Web application 804 creates a log message/file which includes all the relevant information and this is logged using a separate non-blocking I/O thread. After this, the Web application 804's job is done, with respect to logging. Concurrently with the log message preparation (step 816), the Web application performs the associated interactions and, when complete, sends a confirmation of associated changes to the admin 802 (step 818).

Also, the log message is sent to or retrieved by the log forwarder 704 (step 820). Note, the log forwarder 704 can be implemented separately from the Web application 804. Also, the log forwarder 704 can be a separate device, such as one or more servers 300 that are coupled to various Web applications 804. Other embodiments are also contemplated. Specifically, the log forwarder 704 can pick up log messages from the Web application 804 log files (completely separate from main business application running on the Web application 804) to send it to the log indexer 702. The log forwarder 704 receives the log messages and forwards these messages to the log indexer 702 (step 822), and the log indexer 702 creates the required indexes for a quicker search (step 824). These indexes mainly include admin details, organization details and date of the action. The log indexer 702 acts as a centralized storage and indexes all the logs on the basis of the information provided in the log message. Again this indexing is completely segregated from Web application 804.

Afterward, the admin 802 (or another user or admin) can audit changes (step 826). Here, the admin 802 (or another user) is looking to run/create a report looking at previous interactions. This functionality can be performed through the Web application 804 (or some other application, such as a UI associated with the log indexer 702). To perform the audit, the admin 802 makes a request through the Web application 804 which can use logic to query log messages in the log indexer 702 (step 828). The log indexer 702 is configured to retrieve data based on the query from the admin 802 and return the associated log messages (or consolidated data) to the Web application 804 (step 828). Note, the log indexer 702, having centrally located indexed data, provides fast retrieval of data. The Web application 804 is configured to process the returned data from the log indexer 702 and create a user-friendly audit report (step 830) and to provide the audit report to the admin 802 (step 832). That is, the Web application is configured to process the returned data and convert it into a presentable format for presentation back to the admin 802. Specifically, later when admin 802 queries the audit reports, the request will first received by the Web application 804, which will eventually call the log indexer 704 for the results. Once the Web application 804 gets the results back from the log indexer 704, it massages the results and return it back in a presentable format.

The logging system 700 only includes the log forwarder 704 and the log indexer 702. The Web application 804 only uses standard non-blocking I/O to dump these log messages in log files. The Web application 804 does O't forward these logs to the logging system 700. Its the job of the log forwarder 704 to read these log files and forward the logs to the log indexer 702. The Web application 804 relies on intercepting HTTP calls from interactions by the admin 802 and the logging system 700 is configured to obtain the log files, to implement auditing and tracking non-intrusively with separate logic. This led to a system that is developed and implemented separately from the systems 100, 500 or any other cloud-based systems. Also, this approach is extensible and more robust than having auditing and tracking integrated into the Web application 804. As cloud-based systems grow, the logging system 700 can be scaled as well. The logging system 700 can be considered a combination of a distributed and centralized approach—distributed to intercept HTTP calls from the Web applications 804 and centralized to store the associated data in the log indexer 702. The interaction is through a UI where the admin 802 can create reports for various purposes.

§ 8.0 Distributed Auditing and Tracking System

Figure 9:
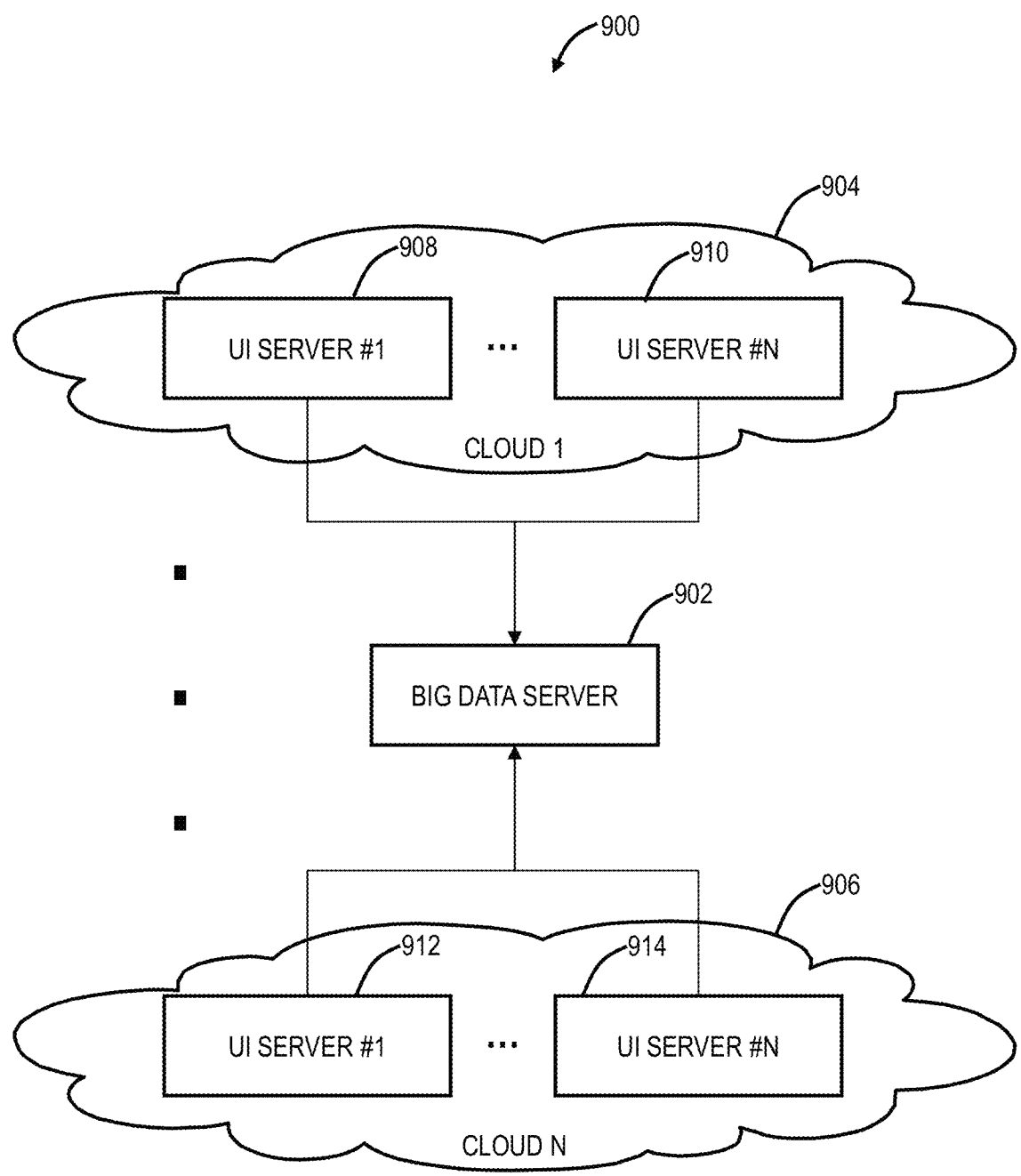
FIG. 9 is a network diagram of a distributed auditing and tracking system.

Referring to FIG. 9, in an exemplary embodiment, a network diagram illustrates a distributed auditing and tracking system 900. The distributed auditing and tracking system 900 includes a big data server 902 communicatively coupled to one or more cloud-based systems 904, 906. The big data server 902 can be the log indexer 702 or the like. The cloud-based systems 904, 906 can be the systems 100, 500 or any other cloud-based system. The cloud-based systems 904, 906 include one or more UI servers 908, 910, 912, 914. The distributed auditing and tracking system 900 can be used to monitor multiple cloud-based systems, e.g., 1 to N cloud-based systems 904, 906, and each cloud-based system 904, 906 can include multiple UI servers 908, 910, 912, 914, i.e., 1 to N UI servers. In this manner, the distributed auditing and tracking system 900 can be used to monitor hundreds, thousands, even millions of users interacting with the UI servers 908, 910, 912, 914. Note, the UI servers 908, 910, 912, 914 can be the Web application 804. Thus, the distributed auditing and tracking system 900 is separate from the cloud-based systems 904, 906, and can thus support multiple cloud-based systems 904, 906 simultaneously. The only logic included in the cloud-based systems 904, 906 is the HTTP interception logic for intercepting HTTP calls and forwarding associated data to the big data server 902. In an exemplary embodiment, the big data server 902 can be a Splunk server. Splunk captures, indexes and correlates realtime data in a searchable repository from which it can generate graphs, reports, alerts, dashboards, and visualizations.

In an exemplary embodiment, each of the UI servers 908, 910, 912, 914 are configured with interception logic in addition to their main application logic. In this manner, the UI servers 908, 910, 912, 914 and/or the cloud-based systems 904, 906 can be separate organizations or even performing separate and distinct functions. The distributed auditing and tracking system 900 is segregated from the cloud-based systems 904, 906, and the big data server 902 can store audit and log information received from the UI servers 908, 910, 912, 914. There does not have to be uniformity in the UI servers 908, 910, 912, 914 to operate with the big data server 902; rather, the UI servers 908, 910, 912, 914 each need to have appropriate interception logic to intercept HTTP calls and store the associated data in an appropriate format, such that a log forwarder can provide to the big data server 902.

The big data server 902 can perform indexing and storage based on its own internal logic, separate and distinct from the cloud-based systems 904, 906. Also, the indexing and storage can reference the particular cloud-based system 904, 906, user, etc. Locally, at the UI servers 908, 910, 912, 914, when a user makes a request to download auditing and tracking information, the UI server 908, 910, 912, 914 can make a REST API call to the big data server 902. For example, the request could get all the logs on the following filtering criteria: (a) organization, (b) date (e.g., range and/or specific time period, (c) log file (e.g., if there are multiple sources of information, and (d) source (e.g., this information can either be hostnames of the UI servers or cloud name.

The big data server 902 can be configured to manage log files which are used to store all the admin initiated transactions monitored by the UI servers 908, 910, 912, 914. For this feature, the big data server 902 can use API implementation to log all the POST, PUT and DELETE requests (POST and PUT are corresponding to CREATE and UPDATE respectively). The big data server 902 can use the following JSON structure to store information along with other required information: Timestamp, action date/time; organization identifier; User identifier/login name; operation (CREATE/DELETE/UPDATE); and resource name.

In an exemplary embodiment, for application logic in the big data server 902, the front and back end communication is completely asynchronous. Four REST APIs are introduced in order to have smooth communication between the front end and the API module—POST/auditReport, GET/auditReport, DELETE/auditReport, GET/auditReport/download.

For POST/auditReport, this API actually creates a request to download the audit logs. Once this request is made, in the backend a new thread is created that starts pulling logs from big data server 902 and dumps it in a temporary Comma Separated Values (CSV) file. A new location can be created to store these log files. For the GET/auditReport, this API is the polling API for the front end, to check the status of the job submitted via the POST API. For example, the following status are supported: INIT, EXECUTING, COMPLETE, CANCELLED, ERRORED, VALIDATING.

For DELETE/auditReport, this API cancels the previously submitted request. For GET/auditReport/download, once the GET/auditReport returns status "COMPLETED" that means all the logs are downloaded from big data server 902 and stored in the temporary CSV file. This file will download the content of that CSV for the end user.

§ 9.0 User/Admin Interactions

The logging system 700 and the distributed auditing and tracking system 900 are configured to monitor any configured interaction between a user or the admin 802 with the Web application 804, the UI servers 908, 910, 912, 914, etc. In an exemplary embodiment, the interactions are for the system 100, the cloud-based system 500, or the like provided cloud-based distributed security. The following is an exemplary list of interactions/configuration changes that can be tracked/audited.

Figure 10:
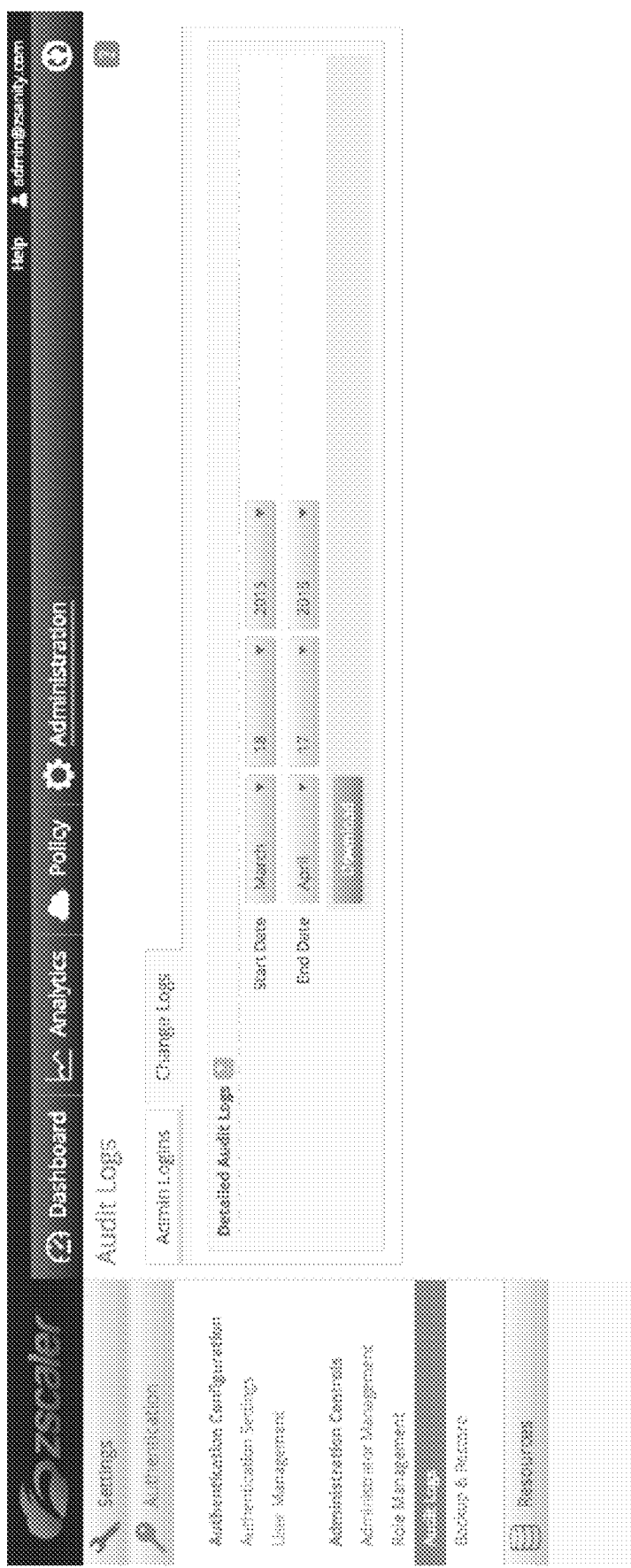
FIG. 10 is a UI screen of an audit log dashboard for the logging system of FIG. 7 or the distributed auditing and tracking system of FIG. 9.
Figure 11:
FIG. 11 is a UI screen of an audit report for the logging system of FIG. 7 or the distributed auditing and tracking system of FIG. 9.
Figure 12:
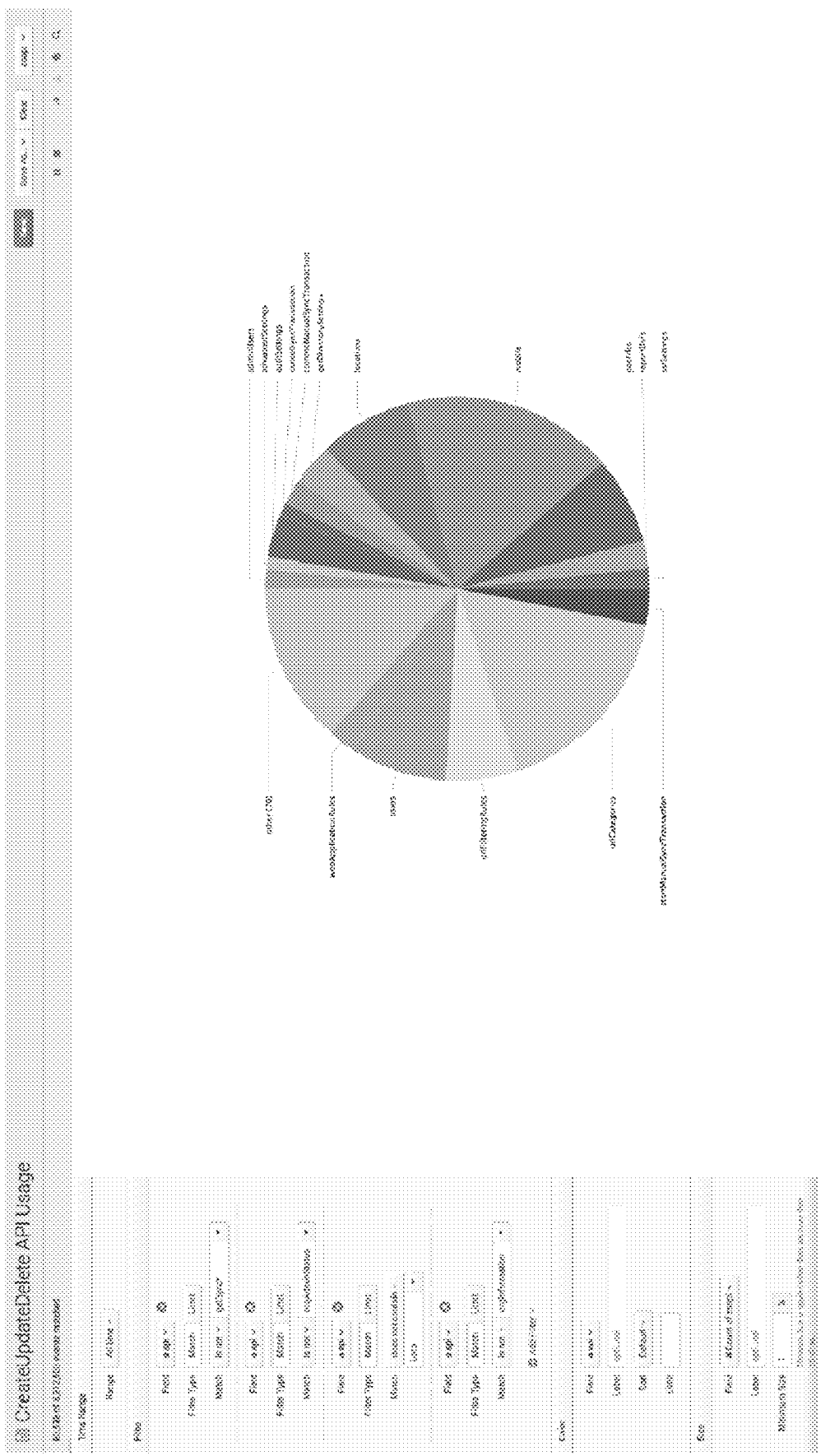
FIG. 12 is a UI screen of a graph report for the logging system of FIG. 7 or the distributed auditing and tracking system of FIG. 9.

Bandwidth Control Rule
File Type Rule
Uniform Resource Location (URL) filtering Rule
Mobile App Download Rule
Web Application Rule
Web Data Leakage Prevention (DLP) Rule
Dynamic network address translation (DNAT) Rule
Firewall Domain Name Server (DNS) Rule
Firewall Filtering Rule
Secure Socket Layer (SSL) Settings
File Transfer Protocol (FTP) Settings
Advanced Settings
Locations
Virtual Private Network (VPN) Credentials
Advanced Threat Settings
Behavioral Analysis (BA) Settings
Browser Control Settings
Firewall Network Settings
Virus Spyware Settings
Role Management
Mobile Malware Protection § 10 Example UI screens FIG. 10 is a UI screen of an audit log dashboard for the logging system of FIG. 7 or the distributed auditing and tracking system of FIG. 9; FIG. 11 is a UI screen of an audit report for the logging system of FIG. 7 or the distributed auditing and tracking system of FIG. 9; FIG. 12 is a UI screen of a graph report for the logging system of FIG. 7 or the distributed auditing and tracking system of FIG. 9; and FIG. 13 is a CSV file of an exemplary audit report from the logging system of FIG. 7 or the distributed auditing and tracking system of FIG. 9.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for tracking and auditing configuration changes in one or more cloud-based systems, the method comprising:
   at a Web application, intercepting requests that are HyperText Transfer Protocol (HTTP) calls between one or more users and the Web application associated with the one or more cloud-based systems and creating log messages based on the intercepted requests, to perform the tracking and auditing configuration changes in the one or more cloud-based systems made by the one or more users in lieu of monitoring database change events, wherein the creating the log messages comprises abstracting information from each HTTP call including a type of request which is one of create, update, and delete and associated information related to each HTTP call including organization associated with the request and administrative details, wherein the Web application comprises main application logic and interception logic, wherein the intercepting requests and the creating log messages is performed by the interception logic, separately from the main application logic which performs functions associated with the requests, and wherein the interception logic is implemented in a non-blocking Input/output (IO) thread separate from processor cycles which are reserved for the main application logic such that the intercepting operates non-intrusively with respect to Web application performing the functions associated with the requests;
   at a log forwarder in the logging system, forwarding the log messages to a log indexer, wherein the log forwarder operates on a plurality of devices in the one or more cloud-based systems with at least two devices being a different platform or operating system;
   at the log indexer in the logging system, receiving the forwarded log messages and indexing the forwarded log messages in a centralized storage that stores associated data in a searchable repository utilizing a JavaScript Object Notation (JSON) format, wherein the logging system is multi-tenant configured to store data in the log indexer based on user, groups of users, and organization-level segregation, and wherein the data is stored in the log indexer in a schema-less manner such that the indexed data from the forwarded log messages are from any of a plurality of formats; and
   at the logging system, responsive to a query, forwarding responsive indexed data from the centralized storage, based on the query.

2. The method of claim 1, further comprising:
   at the Web application, receiving the forwarded responsive indexed data, creating and formatting the forwarded responsive indexed data for an audit report; and providing the audit report to a user.

3. The method of claim 1, wherein the requests comprise configuration changes for the one or more cloud-based systems by the one or more users.

4. The method of claim 3, wherein the one or more cloud-based systems are a distributed, cloud-based security system.

5. The method of claim 1, wherein the one or more cloud-based systems comprise at least two cloud-based systems which are separate and distinct from one another, the logging system is configured to store the forwarded log messages in the centralized storage from the at least two cloud-based systems in a segregated manner.

6. The method of claim 1, wherein auditing and tracking information associated with the Web application is stored in the centralized storage which is separate from the Web application.

7. The method of claim 1, wherein the logging system comprises a big data server.

8. The method of claim 1, wherein the configuration changes are administrative changes to functioning of the one or more cloud-based systems including at least one of Bandwidth Control Rule, File Type Rule, Uniform Resource Location (URL) filtering Rule, Mobile App Download Rule, Web Application Rule, Web Data Leakage Prevention (DLP) Rule, Dynamic network address translation (DNAT) Rule, Firewall Domain Name Server (DNS) Rule, Firewall Filtering Rule, Secure Socket Layer (SSL) Settings, File Transfer Protocol (FTP) Settings, Advanced Settings, Locations Virtual Private Network (VPN) Credentials, Advanced Threat Settings, Behavioral Analysis (BA) Settings, Browser Control Settings, Firewall Network Settings, Virus Spyware Settings, Role Management, and Mobile Malware Protection.

9. The method of claim 1, wherein the indexing and storage of the logging system is based on internal logic separate and distinct from the one or more cloud-based systems, and wherein the query is a Representational State Transfer (REST) Application Programming Interface (API) call to the logging system.

10. A logging system for tracking and auditing configuration changes in one or more cloud-based systems, the logging system comprising:
    one or more Web applications associated with the one or more cloud-based systems; and
    a logging system communicatively coupled to the one or more Web applications, wherein the logging system comprises a log forwarder and a log indexer, wherein the log forwarder operates on a plurality of devices in the one or more cloud-based systems with at least two devices being a different platform or operating system;
    wherein the one or more Web applications are configured to intercept requests that are HyperText Transfer Protocol (HTTP) calls between one or more users and the one or more Web applications associated with the one or more cloud-based systems and create log messages based on the intercepted requests, to perform the tracking and auditing configuration changes in the one or more cloud-based systems made by the one or more users in lieu of monitoring database change events, wherein the log messages are created by abstracting information from each HTTP call including a type of request which is one of create, update, and delete and associated information call including organization associated with the request and administrative details related to each HTTP call, wherein the one or more Web applications each comprise main application logic and interception logic, wherein the intercepting requests and the creating log messages is performed by the interception logic, separately from the main application logic of the Web application which performs functions associated with the requests, wherein the interception logic is implemented in a non-blocking Input/output (TO) thread separate from processor cycles which are reserved for the main application logic such that the intercepting operates non-intrusively with respect to Web application performing the functions associated with the requests;

wherein the log forwarder is configured to forward the log messages to the log indexer;

wherein the log indexer is configured to receive the forwarded log messages and index the forwarded log messages in a centralized storage that stores associated data in a searchable repository utilizing a JavaScript Object Notation (JSON) format, wherein the logging system is multi-tenant configured to store data in the log indexer based on user, groups of users, and organization-level segregation, and wherein the data is stored in the log indexer in a schema-less manner such that the indexed data from the forwarded log messages are from any of a plurality of formats; and wherein the logging system, responsive to a query, is configured to forward responsive indexed data from the centralized storage, based on the query.

11. The logging system of claim 10, wherein the one or more Web applications are further configured to receive the forwarded responsive indexed data, create and format the forwarded responsive indexed data for an audit report, and provide the audit report to a user.

12. The logging system of claim 10, wherein the requests comprise configuration changes for the one or more cloud-based systems by the one or more users.

13. The logging system of claim 12, wherein the one or more cloud-based systems are a distributed, cloud-based security system.

14. The logging system of claim 10, wherein the one or more cloud-based systems comprise at least two cloud-based systems which are separate and distinct from one another, the logging system is configured to store the forwarded log messages in the centralized storage from the at least two cloud-based systems in a segregated manner.

15. The logging system of claim 10, wherein auditing and tracking information associated with the Web application is stored in the centralized storage which is separate from the Web application.

16. The logging system of claim 10, wherein the logging system comprises a big data server.

17. The logging system of claim 10, wherein the configuration changes are administrative changes to functioning of the one or more cloud-based systems including at least one of Bandwidth Control Rule, File Type Rule, Uniform Resource Location (URL) filtering Rule, Mobile App Download Rule, Web Application Rule, Web Data Leakage Prevention (DLP) Rule, Dynamic network address translation (DNAT) Rule, Firewall Domain Name Server (DNS) Rule, Firewall Filtering Rule, Secure Socket Layer (SSL) Settings, File Transfer Protocol (FTP) Settings, Advanced Settings, Locations Virtual Private Network (VPN) Credentials, Advanced Threat Settings, Behavioral Analysis (BA) Settings, Browser Control Settings, Firewall Network Settings, Virus Spyware Settings, Role Management, and Mobile Malware Protection.

18. The logging system of claim 10, wherein the indexing and storage is based on internal logic separate and distinct from the one or more cloud-based systems, and wherein the query is a Representational State Transfer (REST) Application Programming Interface (API) call to the logging system.

19. A Web application server, comprising:
a network interface;
a processor; and
memory storing instructions that, when executed, cause the processor to authenticate a user associated with a cloud-based system,
receive instructions from the user for making changes in the cloud-based system,
intercept the instructions in a form of an HyperText Transfer Protocol (HTTP) call request, to track and audit configuration changes in the web application server made by one or more users in lieu of monitoring database change events, and
create a log message based on the intercepted HTTP call request by abstracting information from each HTTP call request including a type of request which is one of create, update, and deletes and associated information including organization associated with the request and administrative details related to each HTTP call request, wherein a logging system is configured to retrieve and index the log message from the Web application server for indexing in centralized storage that stores associated data in a searchable repository utilizing a JavaScript Object Notation (JSON) format, wherein the logging system is multi-tenant configured to store data in a log indexer based on user, groups of users, and organization-level segregation, and wherein the data is stored in the log indexer in a schema-less manner such that the indexed data from the forwarded log messages are from any of a plurality of formats,
wherein the Web application server comprises main application logic and interception logic, wherein the intercepting requests and the creating log messages is performed by the interception logic, and the forwarding is performed by a log forwarder, separately from the main application logic of the Web application which performs functions associated with the requests, wherein the log forwarder operates on a plurality of devices in the cloud-based system with at least two devices comprising a different platform or operating system, and
wherein the interception logic is implemented in a non-blocking Input/output (TO) thread separate from processor cycles which are reserved for the main application logic such that the interception operates non-intrusively with respect to Web application performing the functions associated with the requests.

20. The Web application server of claim 19, wherein the configuration changes are administrative changes to functioning of the one or more cloud-based systems including at least one of Bandwidth Control Rule, File Type Rule, Uniform Resource Location (URL) filtering Rule, Mobile App Download Rule, Web Application Rule, Web Data Leakage Prevention (DLP) Rule, Dynamic network address translation (DNAT) Rule, Firewall Domain Name Server (DNS) Rule, Firewall Filtering Rule, Secure Socket Layer (SSL) Settings, File Transfer Protocol (FTP) Settings, Advanced Settings, Locations Virtual Private Network (VPN) Credentials, Advanced Threat Settings, Behavioral Analysis (BA) Settings, Browser Control Settings, Firewall Network Settings, Virus Spyware Settings, Role Management, and Mobile Malware Protection.

* * * * *